United States Patent Office 3,664,733
Patented May 23, 1972

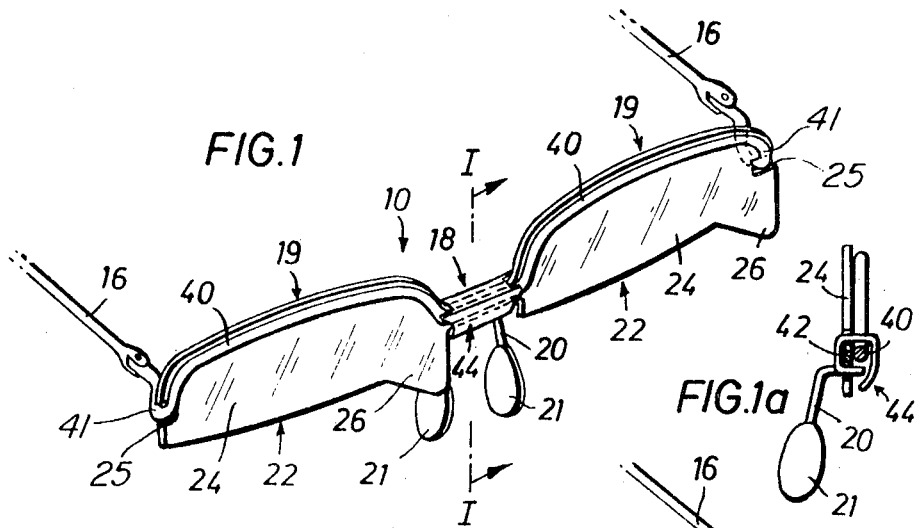
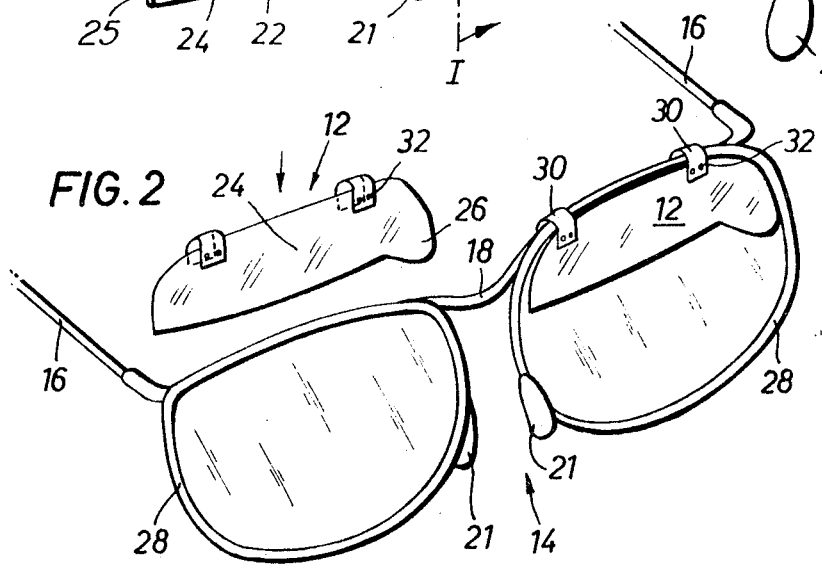
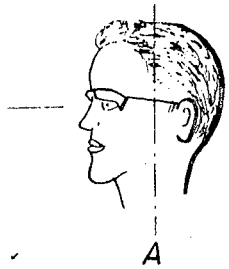
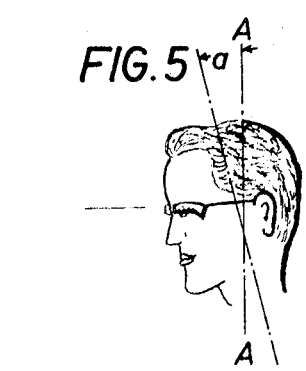
INVENTOR
KURT-ULRICH KALKOWSKI
BY Peter H Smolka
HIS ATTORNEY

3,664,733
ANTIDAZZLE SPECTACLES FOR MOTORISTS
Kurt-Ulrich Kalkowski, 3 Am Bleiberg,
5351 Kommern, Germany
Filed Feb. 17, 1971, Ser. No. 115,955
Int. Cl. G02c 7/10, 7/16
U.S. Cl. 351—45        7 Claims

ABSTRACT OF THE DISCLOSURE

Antidazzle spectacles for use by motorists which includes a colored translucent strip of preferably flexible material which is fixedly attached to the spectacle rim or can be held in clamping relation with the rim by a plurality of hooks attached to the strip and extending therefrom. The strip also includes a horizontal section, and at one end thereof a downwardly tapered section which extends away from the area of attachment of the strip with the rim. The strip absorbs the light beams of oncoming headlights so that the motorist's vision in the direction of the headlights is permitted while his vision in the immediate and intermediate vicinity remains unimpeded. The strip in its flexible form is preferably manufactured as a stamping.

BACKGROUND OF THE INVENTION

This invention relates to antidazzle spectacles for motorists, and more particularly to antidazzle spectacles in which a pair of hangers each including a tapered end section are employed. With increasing traffic density, the dazzling of motorists by the headlights of oncoming vehicles becomes an ever increasing problem. The problem becomes even more critical in view of the new type of halogen headlights being used. Numerous and multifarious means have heretofore already been developed to protect against glare. These include equipment in the streets themselves, such as antidazzle fences, equipment on the lights of motor vehicles, such as polarized light, equipment on the vehicle itself, such as foldable shades, and finally spectacles of various kinds that are worn by the driver himself.

Compared with safety equipment of the other kind, anti-dazzle spectacles have the decided advantage that they are the cheapest, that they are always available to the driver even if he is in someone else's vehicle, and that he is not dependent on the cooperation of other persons as would be the case with illumination by polarized light and antidazzle fences installed by the authorities responsible for road construction.

One kind of antidazzle spectacle is already known constituting a mere further development of conventional sunglasses. These antidazzle spectacles differ from sunglasses in that the lenses are not uniformly colored over their entire surface but exhibit a transition from light to dark, the light regions being disposed at the bottom and the darker or more strongly colored regions at the top. The light beams of an oncoming vehicle dazzling the driver primarily occur in the upper region of his field of view. The dazzling beams are therefore absorbed by the darker upper regions of the lenses. The stretch of roadway lying directly in front of him, i.e., the immediate vicinity, is viewed by the driver through the lower regions of the two lenses which are less intensively colored and therefore impede his vision to a smaller extent than do the upper regions.

Even if the lenses are differently colored over their entire surface, the driver's view of the immediate and intermediate vicinity will be impeded and regarded and observed with reduced brightness. The higher degree of safety achieved by protection against glare is therefore balanced out or even overcompensated by the impeded view of the immediate and intermediate vicinity and thus these known antidazzle spectacles are, when regarded as a whole, worse rather than an improvement. The impaired vision in the intermediate range of about 100 to 400 feet is particularly critical because it is when approaching vehicles appear in this range that he must make decisions such as braking, swerving, etc. This restricted view in the intermediate range is particularly dangerous at dusk during the early hours of the evening when vision is in any case reduced by the unfavorable general lighting conditions.

From a production point of view, these known spectacles have an added disadvantage in that the differently colored lenses take a long time to produce and thereby rendering the spectacles relatively expensive.

It would therefore be desirable to provide antidazzle spectacles which are of improved construction and usefulness. In particular, the spectacles are to be so constructed that only the dazzling light beams of oncoming headlights are absorbed while the vision in the immediate and intermediate vicinity remains unimpeded.

OBJECTS AND SUMMARY OF THE INVENTION

It is therefore a general object of the present invention to provide antidazzle spectacles for motorists which obviates or minimizes disadvantages of the sort noted above.

It is another general object of the present invention to provide antidazzle spectacles for motorists which are relatively inexpensive to manufacture.

It is a particular object of the present invention to provide antidazzle spectacles for motorists in which the spectacles are adapted to cover only those portions of the motorists' field of view in which the dazzling light beams of oncoming headlights are incident.

It is another particular object of the present invention to provide antidazzle spectacles in which a portion thereof is manufactured in strip form and is provided with a downwardly extending tapered end.

It is still another particular object of the present invention to provide antidazzle spectacles for motorists in which a portion thereof is manufactured in strip form and is provided with a downwardly extending tapered end.

It is yet another particular object of the present invention to provide antidazzle spectacles for motorists in which the strip portion may be made from flexible material which can be punched out.

For the practical accomplishment of these basic concepts, the invention departs entirely from conventional glasses and antidazzle spectacles having substantially circular lenses covering the entire field of view.

By means of the invention, the field of view is covered at only those portions in which the dazzling light beams of oncoming headlights are incident. In detail, and based on a spectacle frame comprising bows, a bridge, upper rims connecting the bridge and bows, bridge supports and nose pads, the invention provides that below each upper rim there is secured a strip which covers the upper range of the field of view and which is made from a strongly colored translucent material.

Since oncoming vehicles are on the left with the right-hand traffic that is usual in Germany, for the purpose of covering light beams coming from the front at the lefthand side the invention provides that the aforementioned horizontal strip is extended downwardly at its lefthand end by forming a downwardly tapered section, although it should be understood that the extension can be on the righthand end if the traffic situation so dictates.

To facilitate production and thus to reduce the cost of the antidazzle spectacles, the invention provides that the horizontal strip with the downwardly tapered section consists of a flexible material that can be punched out as, for example, a stamping.

It has been found desirable for the material forming the strip and the tapered section to be colored to more than 75% of its transparency, preferably 90%.

When using a flexible material that can be punched out, the strip is readily attached to the frame if the strip is clamped between the upper rim and the extensions from the upper ends of the bridge supports. These extensions extend parallel to the upper rims and are riveted thereto.

BRIEF DESCRIPTION OF THE DRAWINGS

The invention will now be described in more detail with reference to the two embodiments shown in the drawings, wherein:

FIG. 1 is a diagrammatic perspective view of one embodiment of the antidazzle spectacles according to the invention;

FIG. 1a is a vertical cross section along section line I—I in FIG. 1 showing the fastening of the strip to the bridge of the spectacles;

FIG. 2 is a diagrammatic perspective view of the embodiment comprising the hanger according to the invention before and after being clamped to conventional spectacles;

FIG. 3 is a diagrammatic illustration of the head of a driver wearing the antidazzle spectacles and holding his head in a normal position;

FIG. 4 is a view similar to FIG. 3 but in profile; and

FIG. 5 is a view corresponding to FIG. 4 but with the head inclined downwardly.

DESCRIPTION OF THE PREFERRED EMBODIMENT

Referring now more particularly to FIGS. 1–5, wherein like parts are indicated by like numerals throughout, there is shown in FIG. 1 sunglasses 10 according to the invention while FIG. 2 shows a hanger 12. This hanger 12 is shown at the lefthand side before being clamped on and at the righthand side after clamping to the lefthand lens of conventional spectacles 14. The antidazzle spectacles 10 according to the invention comprises: a frame portion including two bows 16, a downwardly sloping central bridge 18, upper rims 19, rim supported elements 20 and nose pads 21; and a strip portion which consists of strongly colored translucent material. The strip portion 22 is a part of the upper rims 19. The strip portion 22 includes a horizontal section 24 having notches 25 at the outer periphery thereof and at its lefthand end (to the righthand side as viewed in FIG. 1), a downwardly tapered section 26. Tapered section 26 is rounded off at its lower end to avoid injuring the person wearing the spectacles. The distance between pads 21 can be changed by bending. Thus, one fits the spectacles on a narrow or wide nose and adjusts them to the proper height or position such that the user, as shown in FIG. 4, looks beneath the horizontal sections 24 when holding his head horizontal. In the FIG. 1 embodiment upper rims 19 comprise wire-shaped metal strips 40 having curved end portions 41 which extend in front of the upper margin of the horizontal strip sections 24 and within the notches 25 at the ends of the strip selections. The bows 16 are pivotally connected to the outer ends of the wire-shaped metal strips 40. As it appears from the cross sectional view in FIG. 1a the wire-shaped metal strip 40 engages the outer surface of a strip section 42 which spans the horizontal sections 24 of strip portion 22 at either side of the bridge 18. Said strip section 42 is integral with the horizontal sections 24. A metal sheet portion 44 is closely clamped about said engaging portions of the wire-shaped strip 40 and strip section 42 thus holding them together.

As clearly shown in FIG. 1a the metal sheet portion 44 is bent around the engaging portions of the wire-shaped metal strip 40 and the strip section 42 and thus clamps strip section 42 and integral horizontal sections 24 to the wire-shaped metal strip 40. Accordingly, for assembling said embodiment strip sections 22, 24, 42 are placed adjacent the metal strips 40 comprising the upper rims 19 and secured thereto by bending metal sheet portion 44 around the central sections 40 and 42.

The hanger 12 shown in FIG. 2 is identical to the FIG. 1 embodiment as far as the horizontal section 22 and the downwardly tapering section 26 are concerned. At the upper edge of the horizontal section 24 two generally narrow strips of sheet metal hooks 30 are attached to hanger 12 by preferably rivets 32. By means of these hooks, hanger 12 is clamped to the upper edge 19 of the rim 28.

In the FIG. 1 embodiment, the rim supported elements 20 may be extended beyond the portion visible in the drawing so that they run parallel to an in front of or preferably behind the upper rims 19. The hangers 12 are then clamped between the rim 19 and the extension. The rim and extension are riveted together.

FIGS. 3 and 5 illustrate the simple and advantageous use of the antidazzle spectacles of the present invention.

FIG. 3 shows the normal head position of a driver wearing the antidazzle spectacles. It will be seen that the eyes of the driver can freely look straight ahead into the intermediate vicinity without hindrance and also downwardly into the immediate vicinity. The field of view is covered only at the top and outwardly at the left. This in no way hinders or annoys the driver because these regions are of no interest to him in any case and because his field of view at the top is covered by the roof of the car so that the darkening in the upper region of his field of view is not particularly noticeable to him.

FIG. 4 shows the same head in profile. The arrow in FIG. 4 shows the driver's direction of view towards the front. In this direction he has an unimpeded view. There is also shown an axis A—A which is intended to indicate that the driver is holding his head upright.

FIG. 5 shows the driver's head in profile when it is inclinded forwardly and downwardly through an angle $a$. The arrow shown in FIG. 5 indicates the light beam from the headlights of an oncoming vehicle. It will be seen that they strike the now more downwardly disposed strip portions 22 which avoid dazzle. By slightly bending his head through the angle $a$, the driver thus brings the strip portions 22 into the path of incident beams from an oncoming vehicle and prevents dazzling. When the head is held upright in the usual positions of FIGS. 3 and 4, however, there is an unimpeded view ahead.

As the oncoming vehicle comes closer, the light beams from his headlights strike the driver more strongly from the left. He will then gradually move his head somewhat to the right so that the downwardly extending sections 26 enter the path of the light beams and eliminate their dazzle, thus covering the side field of view on which the dazzling light beams of oncoming headlights are approaching. On encountering a dazzling beam from an oncoming vehicle, the driver wearing the anti-dazzle spectacles 10 or the hanger 12 according to the invention will thus first incline his head slightly downwardly and then turn it a little to the right so that the dazzling light beams strike the colored horizontal section 24 and the section 26 and lose their dazzle effect. When the head is held straight as usual, however, the driver has an unhindered clear view ahead in the immediate and intermediate vicinity.

SUMMARY OF ADVANTAGES

Thus, it may be seen that in following the present invention an improved antidazzle spectacle for motorists is provided.

Particularly significant is the fact that the antidazzle spectacles of the present invention is adapted to cover only that portion of the motorists field of view in which the dazzling light beams of oncoming headlights are incident.

Of independent significance is the provision of antidazzle spectacles in which a portion thereof is manufactured in strip form and is provided with a downwardly extending tapered end section which covers the motorists side field of view when the dazzling light beams of oncoming headlights are approaching said side.

Of further significance is the fact that the antidazzle spectacles of the present invention are susceptible to being inexpensively manufactured.

Although the present invention has been described with reference to two preferred and illustrated embodiments, it will be appreciated by those skilled in the art that additions, modifications, substitutions and deletions not specifically described may be made without departing from the spirit and scope of the invention.

I claim:
1. Antidazzle spectacles for motorists comprising:
   (a) a frame portion,
      said frame portion including a pair of bows and a central bridge and a pair of rims, said rims extending from said bridge to said bows, and including rim supported elements attached to said rims and nose pads attached to said rim supported elements;
   (b) a strip portion,
      said strip portion being secured to said frame portion and being substantially coextensive with said frame portion and being continuous, said strip portion being a strongly colored translucent material, said strip portion including a horizontal section and a downwardly tapered section; and
   (c) a metal sheet portion clamping about and securing said strip portion and said central bridge.

2. Antidazzle spectacles as defined in claim 1, wherein said strip portion is manufactured from a flexible material that can be punched out.

3. Antidazzle spectacles as defined in claim 1, wherein said strip portion is colored to more than 75% of its transparency.

4. Antidazzle spectacles for motorists comprising:
   (a) a frame portion including a pair of bows, and an elongated wire-shaped strip having curved end portions connecting said bows and forming a bridge for support on the wearer's nose.
   (b) a strip portion manufactured from a strongly colored translucent material, said strip having an upper margin extending closely adjacent the length of said frame portion between said bows of said wire-shaped strip and being continuous, and having notches formed in the outer periphery thereof cooperatively positioned within one curved end portion of said wire-shaped strip,
   (c) a metal sheet strip bent about the bridge formed by the wire-shaped strip and the colored translucent material strip to thereby fasten said color translucent material strip to said bridge.

5. Antidazzle spectacles according to claim 4 wherein said colored translucent material strip comprises a central strip section intermediate two horizontal sections, said intermediate section being adjacent said bridge and clamped thereto.

6. Antidazzle spectacles according to claim 4 wherein said colored translucent material section includes a horizontal section and a downwardly tapered section.

7. Antidazzle spectacles comprising:
   (a) a frame portion, said frame portion including a pair of bows, and a wire-shaped strip having curved end portions and a central bridge portion.
   (b) a continuous strip portion being strongly colored translucent material, said strip portion having an upper margin extending closely adjacent said wire-shaped strip, said strip portion having two horizontal sections and two downwardly tapered sections, said strip portion also having a central narrow strip section intermediate the horizontal sections, said intermediate section being adjacent said bridge, said strip portion having notch means on the ends thereof for receiving said curved end portions of said frame portion, and
   (c) a metal strip fastening the central bridge portion of said wire-shaped strip and the central narrow strip section of said translucent strip by being bent thereabout.

References Cited
UNITED STATES PATENTS

| | | | |
|---|---|---|---|
| 2,511,776 | 6/1950 | Kelly | 351—45 |
| 3,425,773 | 2/1969 | Masucci | 351—45 |
| 2,513,214 | 6/1950 | Stegeman | 351—106 |

DAVID SCHONBERG, Primary Examiner

R. L. SHERMAN, Assistant Examiner

U.S. Cl. X.R.

351—101, 133